United States Patent
Chen (10) Patent No.: US 10,807,065 B2
(45) Date of Patent: Oct. 20, 2020

(54) BAFFLING TUBE BOX, CONTINUOUS FLOW REACTOR, CONTINUOUS FLOW REACTION SYSTEM AND CONTROL SYSTEM

(71) Applicant: SHANDONG NUOWEI PHARMACEUTICAL FLUID SYSTEM CO., LTD., Linyi (CN)

(72) Inventor: Yankun Chen, Qingdao (CN)

(73) Assignee: SHANDONG NUOWEI PHARMACEUTICAL FLUID SYSTEM CO., LTD., Linyi (CN)

( * ) Notice: Subject to any disclaimer, the term of this patent is extended or adjusted under 35 U.S.C. 154(b) by 0 days.

(21) Appl. No.: 16/616,447

(22) PCT Filed: May 28, 2018

(86) PCT No.: PCT/CN2018/088680
§ 371 (c)(1),
(2) Date: Nov. 22, 2019

(87) PCT Pub. No.: WO2018/223862
PCT Pub. Date: Dec. 13, 2018

(65) Prior Publication Data
US 2020/0179899 A1    Jun. 11, 2020

(30) Foreign Application Priority Data

Jun. 9, 2017 (CN) ............... 2017 1 0433895
Jun. 9, 2017 (CN) ............... 2017 1 0434482

(Continued)

(51) Int. Cl.
*B01J 19/24* (2006.01)
*B01J 19/00* (2006.01)

(52) U.S. Cl.
CPC ......... *B01J 19/2405* (2013.01); *B01J 19/006* (2013.01); *B01J 19/243* (2013.01);
(Continued)

(58) Field of Classification Search
CPC .... B01J 19/242; B01J 19/243; B01J 19/1818; B01J 19/1831; B01J 19/2405;
(Continued)

(56) References Cited

U.S. PATENT DOCUMENTS 5,246,062 A * 9/1993 Meijburg ............. A23G 3/0226
                                                                    165/100
2016/0346756 A1* 12/2016 Rubio Martinez .... B01J 19/243

FOREIGN PATENT DOCUMENTS

CN    102160986 A    8/2011
CN    105854781 A    8/2016
(Continued)

*Primary Examiner* — Lessanework Seifu
(74) *Attorney, Agent, or Firm* — SZDC Law PC (57) ABSTRACT

A continuous flow reactor includes a shell, wherein the shell is provided with a shell pass inlet and a shell pass outlet which are communicated with an inner cavity of the shell, tube plates and communication devices are connected to upper and lower ends of the shell, a reaction tube bank is arranged in the shell and includes a plurality of reaction tubes, upper and lower ends of each reaction tube are fixedly connected to the tube plates in a penetrating manner, and all the reaction tubes are sequentially communicated in series through the communication devices.

8 Claims, 6 Drawing Sheets

(30) Foreign Application Priority Data

Jun. 9, 2017 (CN) .................. 2017 2 0668427 U
Jun. 9, 2017 (CN) .................. 2017 2 0675234 U (52) U.S. Cl.
CPC ............. *B01J 2219/00033* (2013.01); *B01J 2219/00087* (2013.01)

(58) Field of Classification Search
CPC ............ B01J 19/006; B01J 2219/00033; B01J 2219/00087; B01J 2219/00099; B01J 2219/00166; B01J 2219/00761
See application file for complete search history.

(56) References Cited

FOREIGN PATENT DOCUMENTS

| | | |
|---|---|---|
| CN | 107051366 A | 8/2017 |
| CN | 107081121 A | 8/2017 |
| CN | 206838087 U | 1/2018 |

* cited by examiner

BAFFLING TUBE BOX, CONTINUOUS FLOW REACTOR, CONTINUOUS FLOW REACTION SYSTEM AND CONTROL SYSTEM

This application is the National Stage Application of PCT/CN2018/088680, filed on May 28, 2018, which claims priority to Chinese Patent Application Nos.: CN 201720675234.5, filed on Jun. 9, 2017; CN 201710434482.5, filed on Jun. 9, 2017; CN 201710433895.1, filed on Jun. 9, 2017; and CN 201720668427.8, filed on Jun. 9, 2017, all of which are incorporated by reference for all purposes as if fully set forth herein.

BACKGROUND OF THE INVENTION

1. Technical Field

The invention relates to the technical field of chemical pharmaceutical equipment, in particular to a baffling tube box, a continuous flow reactor, a continuous flow reaction system and a control system.

2. Description of Related Art

Reactors commonly used in the technical field of chemical pharmaceutics include tube reactors, tank reactors, and the like, wherein the tank reactors typically have a stirring device inside to mix liquid-phase reactants and are low in composition purity and reactive conversion rate, high in energy consumption and severe in pollution. Continuous flow tube reactors are generally used in the field of chemical pharmaceutics to meet the high requirement for the purity of products.

Because the concentration and reaction rate of chemical reactants in the tube reactors vary with the tube length, the tube reactors should have a tube length required for chemical reactions. Existing straight tube reactors or U-shaped tube reactors with a large tube length are too large in size. In addition, the flow condition of reactants in reaction tubes has a direct influence on the heat transfer rate and the continuous mixing effect during a reaction. Traditional straight tube reactors have a poor turbulent flow effect on reactants and a small Reynolds number, which leads to a negative influence on heat-transfer and continuous mixing effects.

BRIEF SUMMARY OF THE INVENTION

The objective of the invention is to solve the aforesaid problems by providing a baffling tube box, a continuous flow reactor, a continuous flow reaction system and a control system. On the one hand, compared with traditional reactors of the same size, the reaction flow is greatly extended, so that a large Reynolds number is obtained under a low flow velocity of reactants, and the turbulent flow effect is greatly improved; and continuous mixing can still be achieved during a continuous flow reaction, so that the condition in each reaction stage can be detected in real time, and installation and assembly are simplified. The technical solution adopted by the invention is as follows:

A baffling tube box is used for realizing sequential and series communication of all reaction tubes of a continuous flow reactor and is formed with a plurality of baffling slots which are separated from one another and communicated with the reaction tubes, and the baffling tube box is an integral component and is provided with a reactant inlet and a reactant outlet.

On the basis of the above technical solution, the baffling tube box is formed with a plurality of online detection instrument interface to be communicated with different baffling slots.

A continuous flow reactor comprises a shell, wherein the shell is provided with a shell pass inlet and a shell pass outlet which are communicated with an inner cavity of the shell, tube plates and communication devices are connected to upper and lower ends of the shell, a reaction tube bank is arranged in the shell and includes a plurality of reaction tubes, upper and lower ends of each reaction tube are fixedly connected to the tube plates in a penetrating manner, and all the reaction tubes are sequentially communicated in series through the communication devices.

On the basis of the above technical solution, the communication devices are baffling tube boxes formed with a plurality of separated baffling slots, a plurality of separated baffling channels are formed by the tube plates and the baffling slots of the baffling tube boxes jointly, the adjacent reaction tubes are sequentially communicated in series in a medium flow direction through the corresponding baffling channels, and the baffling tube boxes are provided with a reactant inlet and a reactant outlet.

On the basis of the above technical solution, the reaction tube bank is composed of a plurality of layers of reaction tubes which are sequentially arranged from inside to outside, and the reaction tubes are spiral twined tubes having a helix angle.

On the basis of the above technical solution, one or more online detection instruments are detachably arranged on the baffling tube boxes and are communicated with the baffling slots.

On the basis of the above technical solution, the tube plates comprise expansion tube plates and welded tube plates, wherein the expansion tube plates are fixedly connected to the upper and lower ends of the shell, the reaction tubes penetrate through the expansion tube plates and are fixedly connected with the expansion tube plates, the welded tube plates are tightly attached to the baffling tube boxes through flanges and the bolts, and the reaction tubes penetrate through the welded tube plates and are fixedly connected with the expansion tube plates.

On the basis of the above technical solution, expansion parts which expand outwards in a radial direction are formed in each reaction tube, the reaction tubes are connected to the expansion tube plates in an expanding manner through the expansion parts, and the tail ends of the reaction tubes are welded to the welded tube plates through weld points.

On the basis of the above technical solution, the baffling slots in the upper and lower baffling tube boxes and installation holes in the upper and lower tube plates are arrayed in a manner capable of realizing the following arrangement form of the tops and bottoms of all the layers of reaction tubes:

from outside to inside: the tops of a first layer of reaction tubes, namely the outermost layer of reaction tubes, are arrayed to form a first upper circle, the tops of a second layer of reaction tubes are arrayed to form a second upper circle which is concentric with the first upper circle and has a diameter smaller than that of the first upper circle, and so on until the last layer of reaction tubes, namely the innermost layer of reaction tubes, are arrayed to form a corresponding upper circle; from outside to inside: the bottoms of the first layer of reaction tubes, namely the outermost layer of reaction tubes, are arrayed to form a first lower circle, the bottoms of the second layer of reaction tubes are arrayed to form a second lower circle which is concentric with the first lower circle and has a diameter smaller than that of the first lower circle, and so on until the last layer of reaction tubes, namely the innermost layer of reaction tubes, are arrayed to form a corresponding lower circle; the centers of the upper circles and the centers of the lower circles are located on the axis of the shell, and angles between vertical lines from the tops of the reaction tubes to the axis of the shell and vertical lines from the bottoms of the reaction tubes to the axis of the shell are equal.

On the basis of the above technical solution, when the number of the reaction tubes is an even number which is set as N, the reactant inlet and the reactant outlet are located on the same baffling tube box, the number of the baffling slots in the baffling tube box provided with the reactant inlet is (N/2)−1, and the number of the baffling slots in the other baffling tube box is N/2; and when the number of the reaction tubes is an odd number which is set as N, the reactant inlet and the reactant outlet are located on the two baffling tube boxes separately, and the number of the baffling slots in each of the upper and lower baffling tube boxes is (N−1)/2.

On the basis of the above technical solution, straight lines from the tops of the reaction tubes to the bottoms of the reaction tubes are parallel to the axis of the shell.

On the basis of the above technical solution, two spiral lines which have opposite spiral directions and identical helix angles are pressed on the outer wall of each reaction tube, so that spiral protrusions which protrude inwards and correspond to the two spiral lines are formed on the inner wall of the reaction tube.

A continuous flow reaction system comprises a feeding device, a mixing device, a preheating device and the continuous flow reactor which are communicated in sequence, wherein the feeding device comprises a plurality of sets of feed tanks, feed pumps and flow controllers which are connected in sequence, each feed tank contains one reaction solution, and the flow controllers are used for controlling the feed pumps to pump the reaction solutions from the feed tanks at a certain rate;

A stirring paddle is installed in the mixing device and is driven by a servo motor to mix the reaction solutions pumped from the feed tanks to obtain a mixed solution; and The preheating device comprises a device used for preheating a tube pass and/or a device used for preheating a shell pass, the mixed solution from the mixing device circulates in the tube pass, and a preheating medium used for preheating a reactant circulates in the shell pass.

A continuous flow tube reaction control system is used for controlling the continuous flow reaction system and comprises an input unit and a control unit, wherein the input unit is used for selecting a preset reaction mode, and the control unit is used for outputting a control signal on the basis of the reaction mode selected through the input unit to control the continuous flow tube reaction system to operate, wherein the control unit comprises:

A plurality of feed control device, wherein each feed control device is connected with one feed tank to control the flow velocity and flow rate of one reaction solution;

A mixing control device used for controlling the speed of the servo motor;

A preheating control device comprising a preheating temperature detection device and a preheating medium control device, wherein the preheating temperature detection device is used for detecting the temperature of the preheated solution in the preheated tube pass of the preheating device, and the preheating medium control device is used for controlling the temperature and flow velocity of the preheating medium in the preheated shell pass of the preheating device according to the temperature of the preheated solution; and A reaction control device comprising a reaction condition detection device, a reactant flow velocity control device and a heating medium control device, wherein the reaction condition detection device comprises a temperature detection instrument, a pressure detection instrument and a flow velocity detection instrument and is used for detecting temperature, pressure and flow velocity data in the reaction tubes, the reactant flow velocity control device is used for controlling the flow velocity of the reactant according to the flow velocity data in the reaction tubes, and the heating medium control device is used for controlling the temperature and flow velocity of a heating medium in a shell pass of the reactor according to the temperature and pressure data in the reaction tubes.

The invention has the following advantages: compared with traditional reactors of the same size, the reaction flow is greatly extended, so that a large Reynolds number is obtained under a low flow velocity of reactants, and the turbulent flow effect is greatly improved; and continuous mixing can still be achieved during a continuous flow reaction, so that the condition in each reaction stage can be detected in real time, and installation and assembly are simplified.

Multiple reaction solutions are fully mixed through the mixing device, so that the reaction efficiency is improved.

The mixed reaction solution is heated in advance before entering the reactor through the preheating device and can reach a reaction temperature as soon as possible after entering the reactor, so that the reaction efficiency is improved.

The reaction conditions of the reaction system in all stages are detected in real time through the reaction control system, and accurate feedback and regulation are performed, so that all reaction conditions in the reaction system are accurately controlled.

BRIEF DESCRIPTION OF THE SEVERAL VIEWS OF THE DRAWINGS

For the sake of a clearer explanation of the technical solutions of the embodiments of the invention or the prior art, a brief description of the accompanying drawings used for the description of the embodiments of the invention or the prior art is given below. Clearly, the drawings in the following description are only for one embodiment of the invention, and those ordinarily skilled in the art can obtain drawings of other embodiments according to the following ones without creative labor.

DETAILED DESCRIPTION OF THE INVENTION

The invention is further explained below in combination with the accompanying drawings and embodiments.

The embodiments of the invention are detailed below and are illustratively shown in the accompanying drawings, and in the whole description, identical or similar reference signs represent identical or similar elements or represent elements with identical or similar functions. The embodiments described below with reference to the accompanying drawings are illustrative ones which are only used for explaining the invention, and should not be interpreted as limitations of the invention.

It should be noted that unless otherwise stated or specified, the terms "install", "connect", and "connection" in the description of the invention should be broadly understood. For example, "connection" may refer to fixed connection, detachable connection, integrated connection, direct connection, or indirect connection via intermediate media. Those ordinarily skilled in the art can figure out the specific meanings of these terms in the invention as the case may be.

Figure 4:
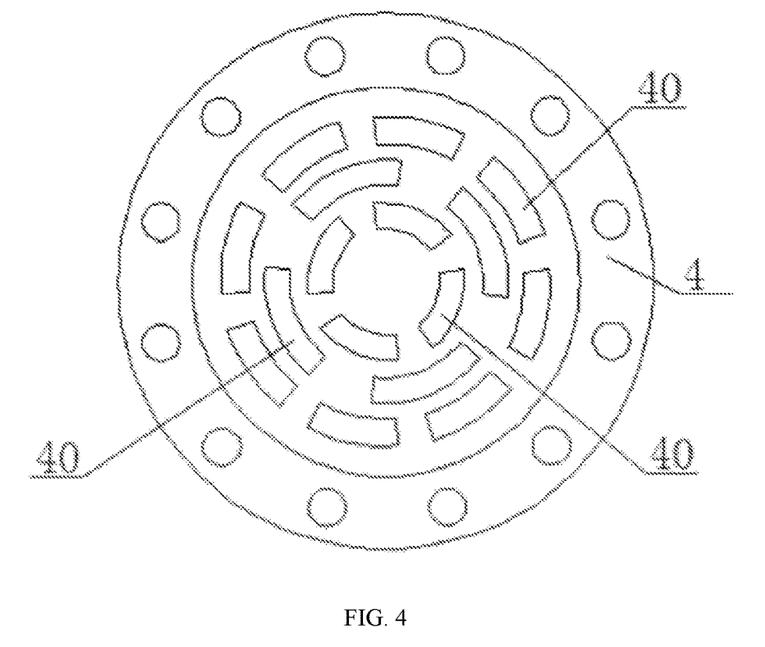
FIG. 4 is a bottom view of one embodiment of an upper baffling tube box of the invention.
Figure 5:
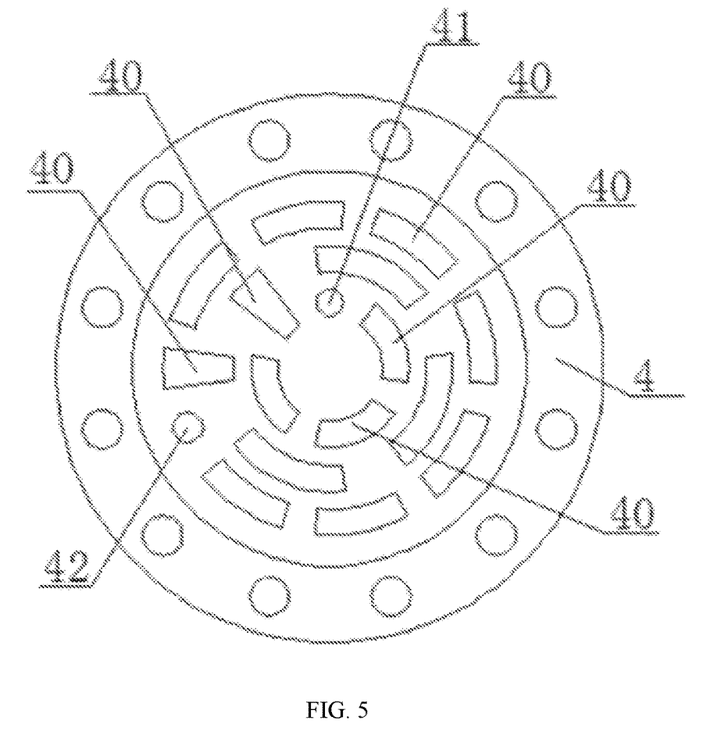
FIG. 5 is a bottom view of one embodiment of a lower baffling tube box of the invention.

As shown in FIG. 4 and FIG. 5, a baffling tube box in this embodiment is used for realizing sequential and series communication of all reaction tubes 20 of a continuous flow reactor and is formed with a plurality of baffling slots 40 which are separated from one another and communicated with the reaction tubes 20. The baffling tube box 4 is an integral component and is provided with a reactant inlet 41 and a reactant outlet 42.

Preferably, a plurality of online detection instrument interfaces to be communicated with different baffling slots 40 are formed in the baffling tube box 4.

As shown in FIG. 1 to FIG. 5, a continuous flow reactor in this embodiment comprises a shell 1, wherein the shell 1 is provided with a shell pass inlet 10 and a shell pass outlet 11 which are communicated with an inner cavity of the shell 1; a heat-transfer medium circulates in a shell pass of the shell 1 to keep reactants in tube passes of reaction tubes 20 at an appropriate reaction temperature; tube plates 3 and communication devices are connected to upper and lower ends of the shell 1; a reaction tube bank 2 is arranged in the shell and includes a plurality of reaction tubes 20, upper and lower ends of each reaction tube are fixedly connected to the tube plates 3 in a penetrating manner; and all the reaction tubes 20 are sequentially communicated in series through the communication devices.

Preferably, as shown in FIG. 4 and FIG. 5, the communication devices are baffling tube boxes 4 formed with a plurality of baffling slots 40 which are separated from one another. A plurality of separated baffling channels are formed by the tube plates 3 and the baffling slots 40 in the baffling tube boxes jointly. In a medium flow direction, the adjacent reaction tubes 20 are sequentially communicated in series through the corresponding baffling channels. The baffling tube boxes 4 are provided with a reactant inlet 41 and a reactant outlet 42. That is, when the reactant inlet 41 is formed in the lower baffling tube box 4, a reactant flows through the reaction tube bank 2 in the following sequence: the reactant enters the first reaction tube from the bottom via the reactant inlet 41 in the lower baffling tube box 4, flows through the first reaction tube to enter one baffling slot 40 in the upper baffling tube box 4 (this baffling slot corresponds to the top of the first reaction tube and the top of the second reaction tube and realizes communication between the first reaction tube and the second reaction tube) from the top of the first reaction tube, then enters the second reaction tube from the top, flows through the second reaction tube to enter one baffling slot 40 in the lower baffling tube box 4 (this baffling slot corresponds to the bottom of the second reaction tube and the bottom of the third reaction tube and realizes communication between the second reaction tube and the third reaction tube) from the bottom of the second reaction tube, then enters the third reaction tube from the bottom, flows through the third reaction tube to enter one baffling slot 40 in the upper baffling tube box 4 (this baffling slot corresponds to the top of the third reaction tube and the top of the fourth reaction tube and realizes communication between the third reaction tube and the fourth reaction tube) from the top of the third reaction tube, then enters the fourth reaction tube from the top, and so on until the reactant flows out via the reactant outlet 42. It should be noted that the terms such as "first" and "second" in this paragraph are in correspondence with the flow sequence of the reactant, that is, the first reaction tube is the reaction tube allowing the reactant to flow through first. When the baffling tube box of the continuous flow reactor is used, the adjacent reaction tubes are communicated in the medium transfer direction through the baffling slots instead of bends or U-tubes, so that limitations from the radius of the bends are avoided, the distance between the reaction tubes is small, the size of the reactor is small, and the reaction process is long.

Figure 2:
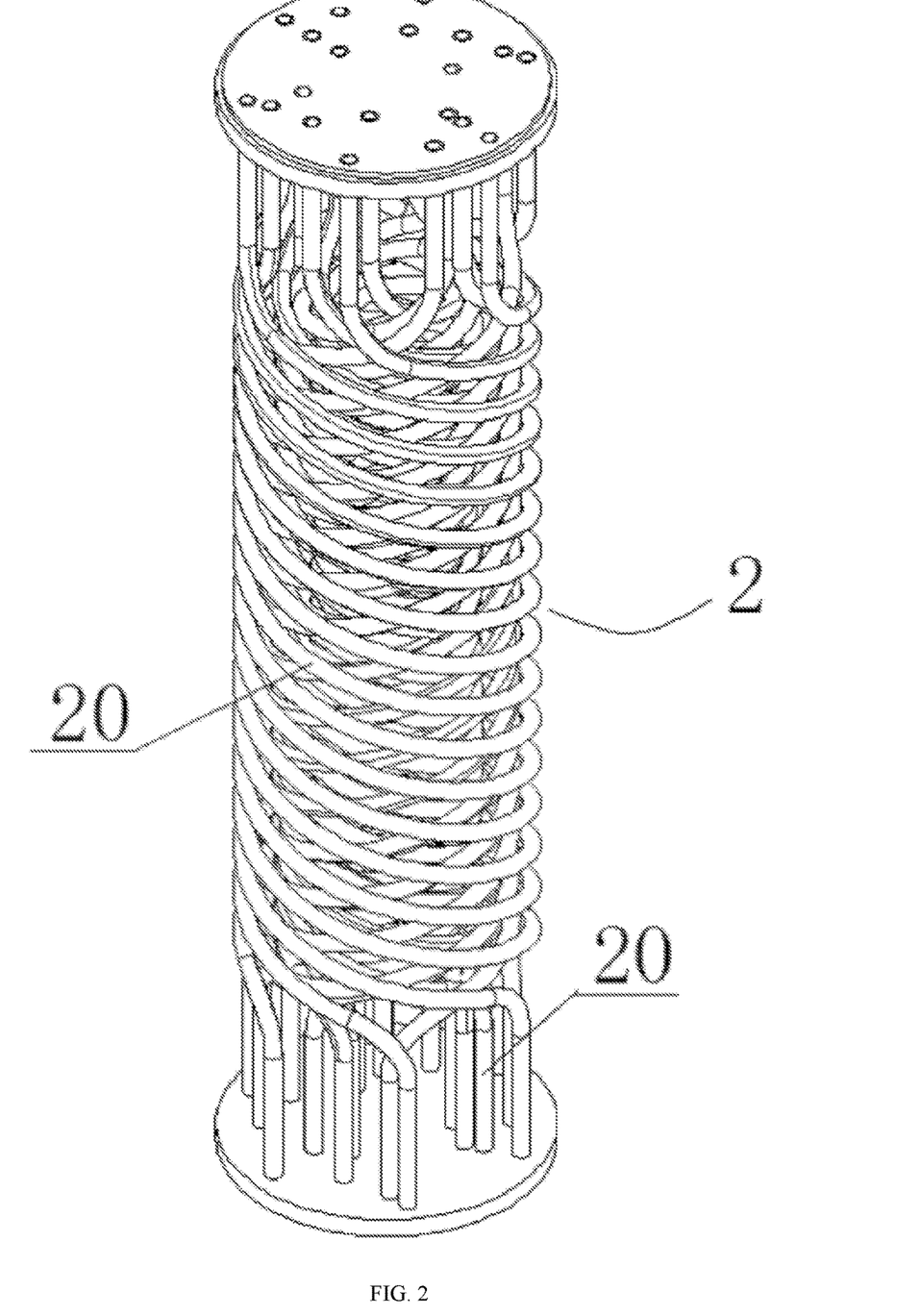
FIG. 2 is a structural view of a reaction tube bank of the invention.
Figure 3:
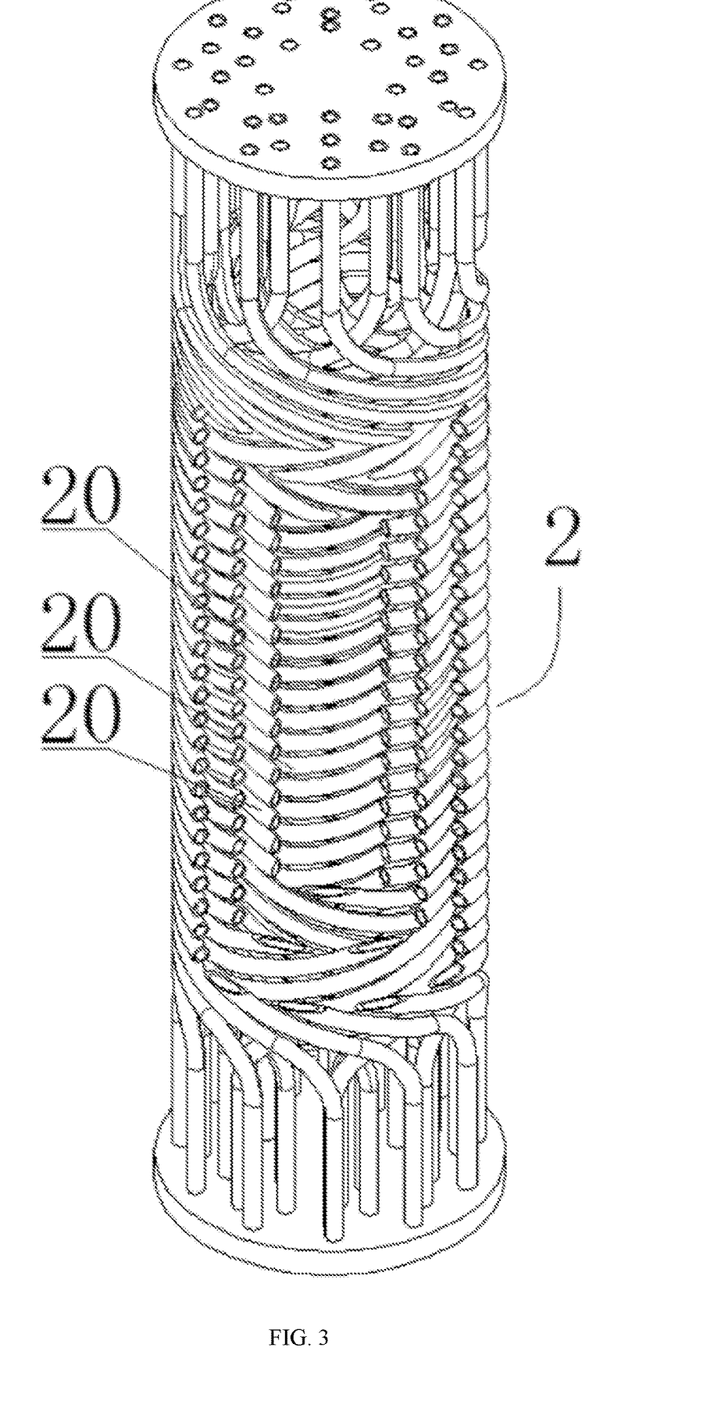
FIG. 3 is a structural view of the reaction tube bank in a partially-sectioned state of the invention.

Preferably, the reaction tube bank 2 is composed of a plurality of layers of reaction tubes 20 which are sequentially arranged from inside to outside. The reaction tubes 20 are spiral twined tubes having a helix angle, so that the reaction flow is further extended under the same size.

Figure 1:
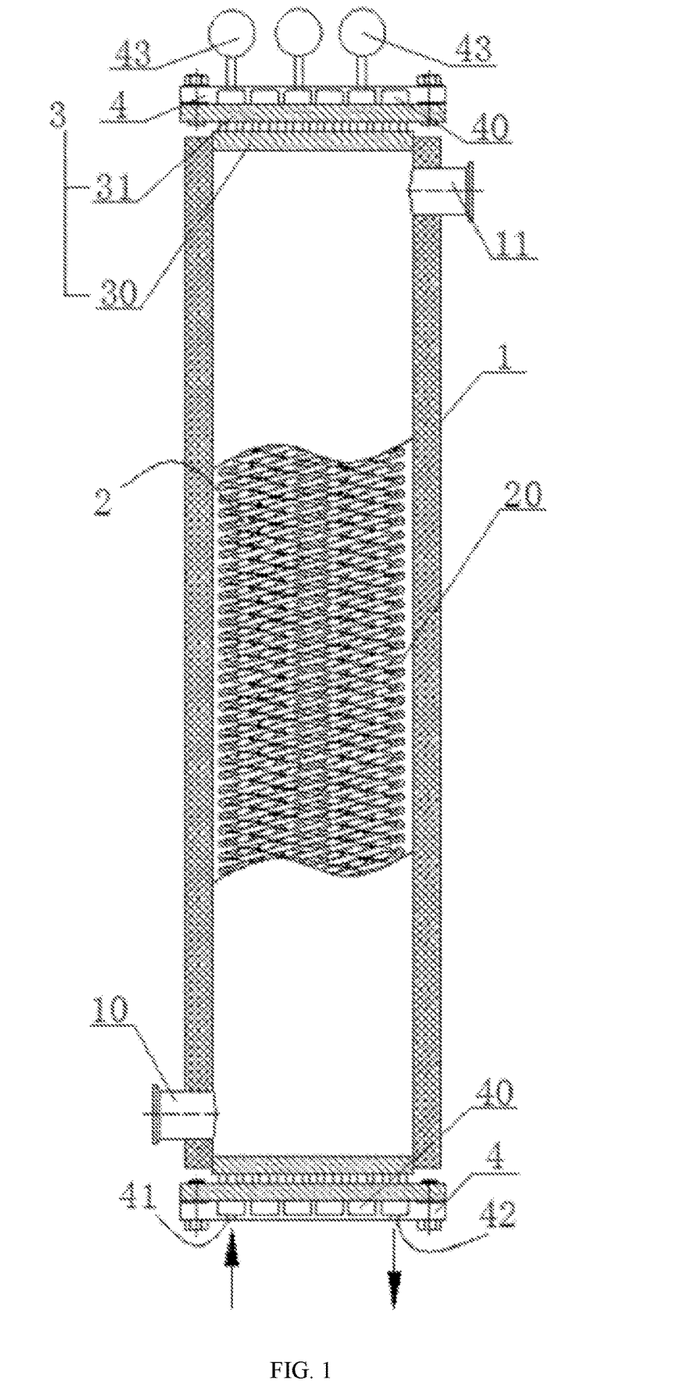
FIG. 1 is a structural view of a continuous flow reactor with a partial section of the invention.

Preferably, as shown in FIG. 1, one or more online detection instruments 43 are detachably arranged on the baffling tube boxes and are communicated with the baffling slots 40. Wherein, the online detection instruments includes, as required, a temperature detection instrument, a pressure detection instrument and a PH detection instrument to detect the real-time temperature, pressure and PH value of the reactant in the reactor. Further preferably, a plurality of online detection instrument interfaces are arranged on the baffling tube boxes, and the online detection instruments are connected to different interfaces to be communicated with different baffling slots 40 so as to detect the reaction state of the reactant under different flow lengths (after the reactant flows through different numbers of reaction tubes).

Figure 7:
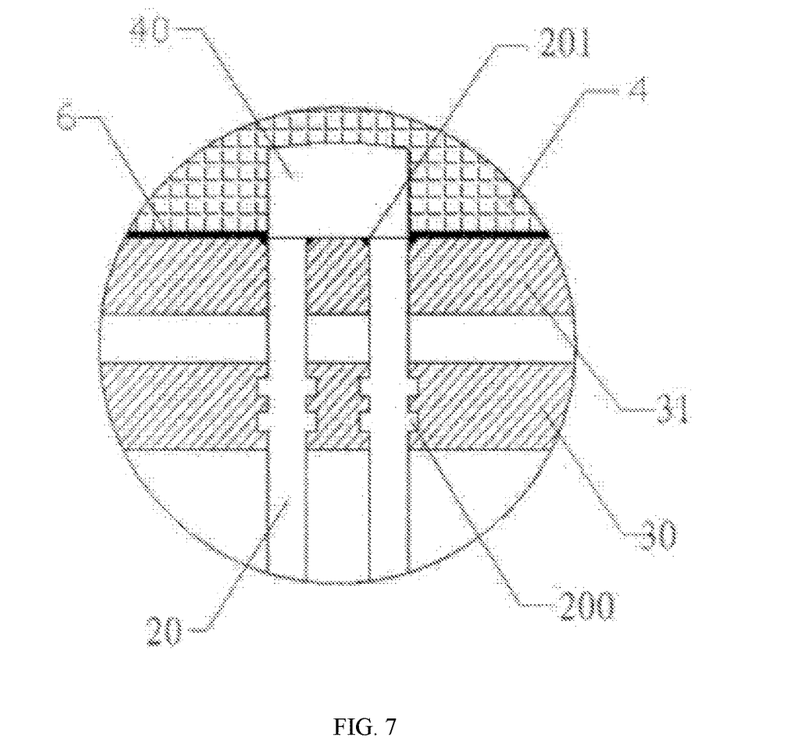
FIG. 7 is a partial sectional view of a tube plate of the invention.

Preferably, as shown in FIG. 7, the tube plates 3 comprise expansion tube plates 30 and welded tube plates 31, wherein the expansion tube plates 30 are fixedly connected to the upper and lower ends of the shell 1, the reaction tubes 20 penetrate through the expansion tube plates 30 and are fixedly connected with the expansion tube plates 30, the welded tube plates 31 are tightly attached to the baffling tube boxes 4 through flanges and bolts, and the reaction tubes 20 penetrate through the welded tube plates 31 and are fixedly connected with the expansion tube plates 30. Furthermore, expansion parts 200 which expand outwards in a radial direction are formed on each reaction tube 20, and the reaction tubes 20 are connected to the expansion tube plates 30 in an expanding manner through the expansion parts 200, so that the process is simple, and the reaction tubes 20 and the expansion tube plates 30 can be tightly combined; and the tail ends of the reaction tubes 20 are welded to the welded tube plates 31 through weld points 201, so that the reaction tubes 20 are protected against weld penetration during welding, and the welding firmness and tightness are guaranteed. Each reaction tube is connected to the expansion tube plates in the expanding manner through two expansion parts 200, so that the connection is tighter and more stable, the medium in the reaction tubes is effectively prevented from entering the shell pass; and the expansion tube plates are tightly connected with the shell 1, so that leakage of the medium in the shell pass is prevented. Preferably, the expansion tube plates 30 are spaced from the welded tube plates 31 by a certain distance.

Figure 6:
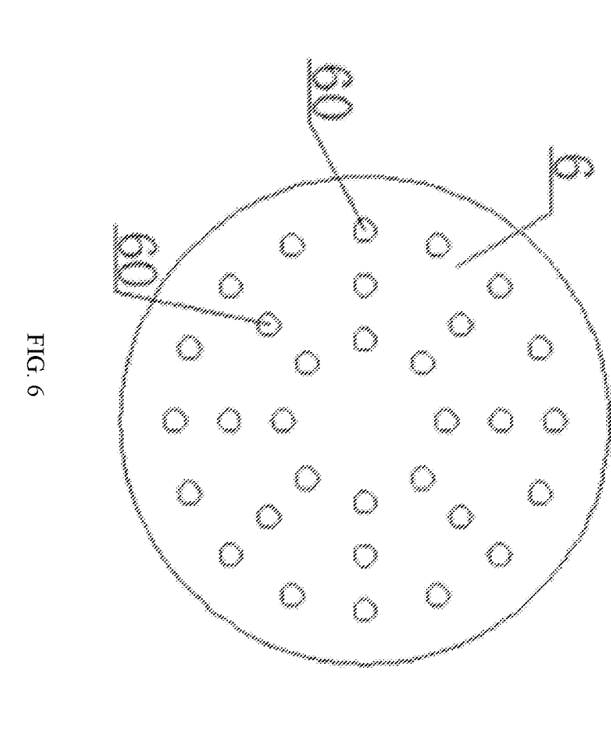
FIG. 6 is a structural view of a lower sealing gasket of the invention.

Furthermore, in order to guarantee the connection tightness of the welded tube plates 31 and the baffling tube boxes 4 to prevent the medium in the baffling slots against leakage without affecting inflow and outflow of the medium to the baffling slots, sheet sealing gaskets 6 are arranged between the baffling tube boxes and the welded tube plates and are provided with baffling holes 60 corresponding to two tail ends of each baffling slot, so that the airtightness of the reactant in the flowing process is guaranteed.

Because the reaction tubes are mostly spiral twined tubes, the reaction tubes need to be combined with the expansion tube plates 30 and the welded tube plates 31 and correspond to the baffling slots 40 of the baffling tube boxes 4 when installed; the lack of an arrangement rule will lead to difficult or even failed installation and confusions of installation personnel, which in turn results in a longer installation time and a higher installation error rate. In order to facilitate the installation of the spiral twined tubes, the baffling slots 40 in the upper and lower baffling tube boxes 4 and installation holes in the upper and lower tube plates 3 are arrayed in a manner capable of realizing the following arrangement form of the tops and bottoms of all the layers of reaction tubes 20:

From outside to inside: the tops of a first layer of reaction tubes 20, namely the outermost layer of reaction tubes 20, are arrayed to form a first upper circle, the tops of a second layer of reaction tubes 20 are arrayed to form a second upper circle which is concentric with the first upper circle and has a diameter smaller than that of the first upper circle, and so on until the last layer of reaction tubes, namely the innermost layer of reaction tubes, are arranged to form a corresponding upper circle; from outside to inside: the bottoms of the first layer of reaction tubes 20, namely the outermost layer of reaction tubes 20, are arrayed to form a first lower circle, the bottoms of the second layer of reaction tubes 20 are arrayed to form a second lower circle which is concentric with the first lower circle and has a diameter smaller than the first lower circle, and so on until the last layer of reaction tubes, namely the innermost layer of reaction tubes, are arrayed to form a corresponding lower circle; the centers of the upper circles and the centers of the lower circles are located on the axis of the shell 1, and angles between vertical lines from the tops of the reaction tubes to the axis of the shell 1 and vertical lines from the bottoms of the (same) reaction tubes to the axis of the shell 1 are equal. Furthermore, straight lines from the tops to the bottoms of the reaction tubes (namely connection line from the top to the bottom of each reaction tube) are parallel to the axis of the shell 1.

When the number of the reaction tubes 20 is an even number which is set as N, the reactant inlet 41 and the reactant outlet 42 are located on the same baffling tube box, the number of the baffling slots 40 in the baffling tube box provided with the reactant inlet 41 is (N/2)−1, and the number of the baffling slots 40 in the other baffling tube box is N/2; and when the number of the reaction tubes 20 is an odd number which is set as N, the reactant inlet 41 and the reactant outlet 42 are located on different baffling tube boxes, and the number of the baffling slots 40 in each of the upper and lower baffling tube boxes is (N−1)/2.

Figure 8:
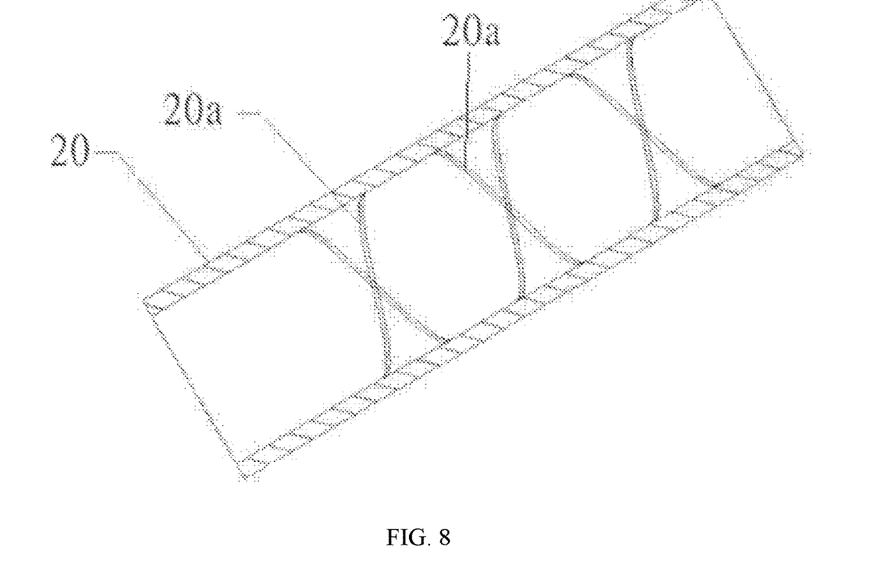
FIG. 8 is a partial sectional view of a reaction tube of the invention.

Preferably, as shown in FIG. 8, two spiral lines 20a which have opposite spiral directions and consistent helix angles are pressed on the outer wall of each reaction tube 20, so that spiral protrusions which protrude inwards and correspond to the two spiral lines are formed on the inner wall of the reaction tube. In this way, when the reactant flows in the reaction tubes, a large turbulent flow is formed; and the reactant spirally and tangentially moves along the spiral protrusions, so that the Reynolds number of the flowing reactant is further increased, the turbulent flow effect is greatly improved, and the heat-transfer and mixing effects of the reactant are improved.

Figure 9:
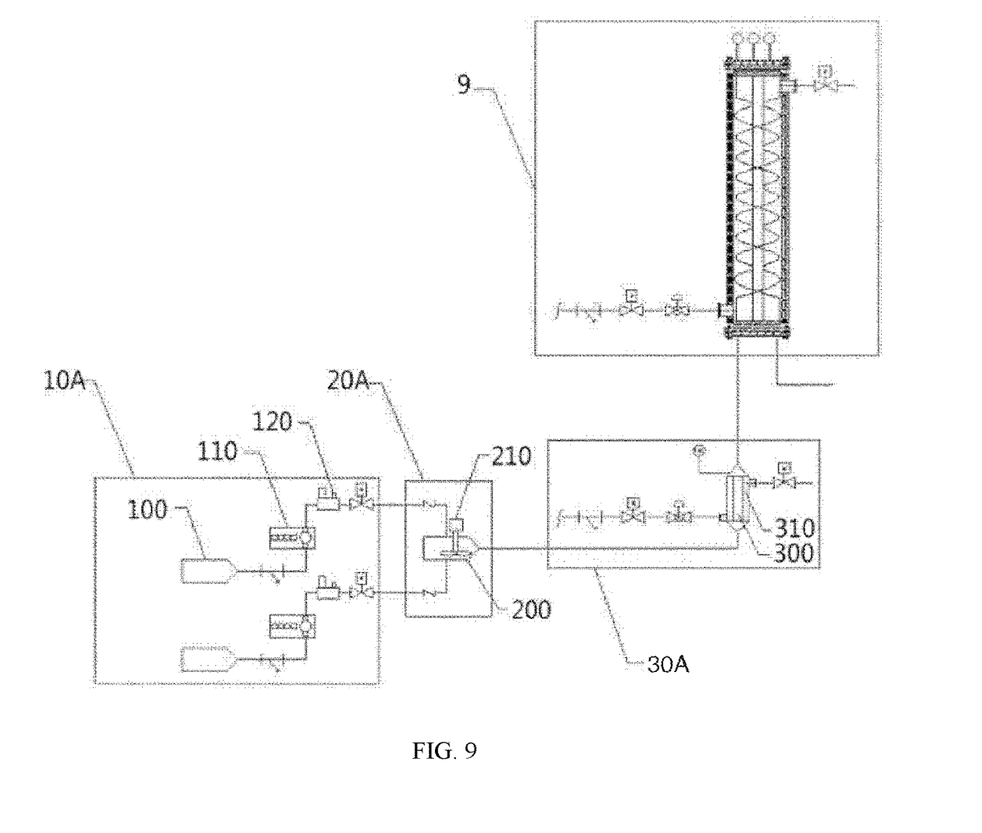
FIG. 9 is a structural view of a continuous flow reaction system of the invention.

As shown in FIG. 9, a continuous flow reaction system in this embodiment comprises a feeding device 10A, a mixing device 20A, a preheating device 30A and the continuous flow reactor 9 which are communicated in sequence. The feeding device 10A comprises a plurality of sets of feed tanks 100, feed pumps 110 and flow controllers 120 which are connected in sequence. Each feed tank 100 contains a reaction solution. The flow controllers 120 are used for controlling the feed pumps to pump the reaction solutions from the feed tanks 100 at a certain rate.

A stirring paddle 200 is installed in the mixing device 20A and is driven by a servo motor 210 to mix the reaction solutions pumped from the feed tanks 100 to obtain a mixed solution.

The preheating device 30A comprises a device 300 used for preheating a tube pass and/or a device 310 used for preheating a shell pass, wherein the mixed solution from the mixing device 20A circulates in the tube passes, a preheating medium used for preheating the reactant circulates in the shell pass, and the continuous flow reactor 9 is connected with the preheating device 30A. The preheating device 30A is located upstream from the continuous flow reactor 9, which means that fluid is preheated before entering the tube passes and/or the shell pass of the continuous flow reactor 9.

A continuous flow tube reaction control system in this embodiment comprises an input unit and a control unit, wherein the input unit is used for selecting a preset reaction mode, and the control unit is used for outputting a control signal on the basis of the reaction mode selected through the input unit to control the continuous flow tube reaction system to operate, wherein the control unit comprises:

A plurality of feed control device, wherein each feed control device is connected with one feed tank to control the flow velocity and flow rate of one reaction solution;

A mixing control device used for controlling the speed of the servo motor;

A preheating control device comprising a preheating temperature detection device and a preheating medium control device, wherein the preheating temperature detection device is used for detecting the temperature of the preheated solution in the preheated tube pass of the preheating device, and the preheating medium control device is used for controlling the temperature and flow velocity of a preheating medium in the preheated shell pass of the preheating device according to the temperature of the preheated solution; and A reaction control device comprising a reaction condition detection device, a reactant flow velocity control device and a heating medium control device, wherein the reaction condition detection device comprises a temperature detection instrument, a pressure detection instrument and a flow velocity detection instrument and is used for detecting temperature, pressure and flow velocity data in the reaction tubes, the reactant flow velocity control device is used for controlling the flow velocity of the reactant according to the flow velocity data in the reaction tubes, and the heating medium control device is used for controlling the temperature and flow velocity of a heating medium in the shell pass of the reactor according to the temperature and pressure data in the reaction tubes.

Furthermore, in this embodiment, the preset reaction mode selected through the input unit includes a preset flow velocity and preset flow rate of each reaction solution, a preset temperature of the preheated solution in the preheated tube pass, a preset temperature and preset flow velocity of the preheating medium in the preheated shell pass, a preset temperature, preset pressure and preset flow velocity in the reaction tubes, and a preset temperature and preset flow velocity of the heating medium in the shell pass of the reactor. Those skilled in the art can use software and a necessary universal hardware platform to realize the preset reaction mode in this embodiment according to the contents of this embodiment.

When the reaction control system in this embodiment operates, the feeding device in the reaction system is controlled to inject multiple stock solutions in the feed tanks into the mixing device according to the preset reaction mode selected through the input unit; after the solutions are fully mixed in the mixing device, a mixed solution enters the preheating device; the preheating control device detects the temperature of the preheated solution in the preheated tube pass of the preheating device and controls the temperature and flow velocity of the preheating medium in the preheated shell pass of the preheating device; and after preheating is finished, the reaction solution enters the reaction device through a continuous flow pipe, and the reaction control device controls the reaction conditions to be stable by detection and feedback.

The invention is explained above with embodiments, but the invention is not limited to the above embodiments. Any alterations or transformations made on the basis of the invention should also fall within the protection scope of the invention.

What is claimed is:

1. A continuous flow reactor, comprising a shell (1), wherein the shell (1) is provided with a shell pass inlet (10) and a shell pass outlet (11) which are communicated with an inner cavity of the shell (1), tube plates (3) and communication devices are connected to upper and lower ends of the shell (1), a reaction tube bank (2) is arranged in the shell and includes a plurality of reaction tubes (20), upper and lower ends of each said reaction tube are fixedly connected to the tube plates (3) in a penetrating manner, all the reaction tubes (20) are sequentially communicated in series through the communication devices, the communication devices are baffling tube boxes (4), the baffling tube boxes (4) are integral components and are formed with a plurality of separated baffling slots (40), a plurality of separated baffling channels are formed by the tube plates (3) and the baffling slots (40) of the baffling tube boxes jointly, the adjacent reaction tubes (20) are sequentially communicated in series in a medium flow direction through the corresponding baffling channels, and the baffling tube boxes (4) are provided with a reactant inlet (41) and a reactant outlet (42),
wherein the reaction tube bank (2) is composed of a plurality of layers of reaction tubes (20) which are sequentially arranged from inside to outside, and the reaction tubes (20) are spiral twined tubes having a helix angle.

2. The continuous flow reactor according to claim 1, wherein one or more online detection instruments (43) are detachably arranged on the baffling tube boxes and are communicated with the baffling slots (40).

3. The continuous flow reactor according to claim 1, wherein the tube plates (3) comprise expansion tube plates (30) and welded tube plates (31), the expansion tube plates (30) are fixedly connected to the upper and lower ends of the shell (1), the reaction tubes (20) penetrate through the expansion tube plates (30) and are fixedly connected with the expansion tube plates (30), the welded tube plates (31) are tightly attached to the baffling tube boxes (4) through flanges and the bolts, and the reaction tubes (20) penetrate through the welded tube plates (31) and are fixedly connected with the expansion tube plates (30).

4. The continuous flow reactor according to claim 1, wherein the baffling slots (40) in the upper and lower baffling tube boxes (4) and installation holes in the upper and lower tube plates (3) are arrayed in a manner capable of realizing the following arrangement form of tops and bottoms of all layers of reaction tubes (20):
from outside to inside: the tops of a first layer of reaction tubes (20), namely the outermost layer of reaction tubes (20), are arrayed to form a first upper circle, the tops of a second layer of reaction tubes (20) are arrayed to form a second upper circle which is concentric with the first upper circle and has a diameter smaller than that of the first upper circle, and so on until the last layer of reaction tubes (20), namely the innermost layer of reaction tubes (20), are arrayed to form a corresponding upper circle; from outside to inside: the bottoms of the first layer of reaction tubes (20), namely the outermost layer of reaction tubes (20), are arrayed to form a first lower circle, the bottoms of the second layer of reaction tubes (20) are arrayed to form a second lower circle which is concentric with the first lower circle and has a diameter smaller than that of the first lower circle, and so on until the last layer of reaction tubes (20), namely the innermost layer of reaction tubes (20), are arrayed to form a corresponding lower circle; the centers of the upper circles and the centers of the lower circles are located on an axis of the shell (1), angles between vertical lines from the tops of the reaction tubes to the axis of the shell (1) and vertical lines from the bottoms of the reaction tubes to the axis of the shell (1) are equal, and preferably, straight lines from the tops to the bottoms of all the reaction tubes are parallel to the axis of the shell (1).

5. The continuous flow reactor according to claim 1, wherein when the number of the reaction tubes (20) is an even number which is set as N, the reactant inlet (41) and the reactant outlet (42) are located on the same baffling tube box, the number of the baffling slots (40) in the baffling tube box provided with the reactant inlet (41) is (N/2)−1, and the number of the baffling slots (40) in the other baffling tube box is N/2; and when the number of the reaction tubes (20) is an odd number which is set as N, the reactant inlet (41) and the reactant outlet (42) are located on the two baffling tube boxes separately, and the number of the baffling slots (40) in each of the upper and lower baffling tube boxes is (N−1)/2.

6. The continuous flow reactor according to claim 1, wherein two spiral lines (20a) which have opposite spiral directions and identical helix angles are pressed on an outer wall of each said reaction tube (20), so that spiral protrusions which protrude inwards and correspond to the two spiral lines are formed on an inner wall of the reaction tube.

7. A continuous flow reaction system, comprising a feeding device, a mixing device, a preheating device and the continuous flow reactor (9) according to claim 1, wherein the feeding device, the mixing device, the preheating device and the continuous flow reactor (9) are communicated in sequence, the feeding device comprises a plurality of sets of feed tanks, feed pumps and flow controllers which are connected in sequence, each said feed tank contains one reaction solution, and the flow controllers are used for controlling the feed pumps to pump the reaction solutions from the feed tanks at a rate;

a stirring paddle is installed in the mixing device and is driven by a servo motor to mix the reaction solutions pumped from the feed tanks to obtain a mixed solution; and     the preheating device comprises a device used for preheating a tube pass and/or a device used for preheating a shell pass, the mixed solution from the mixing device circulates in the tube pass, a preheating medium used for preheating a reactant circulates in the shell pass, and the continuous flow reactor (9) is connected with the preheating device.

8. A continuous flow tube reaction control system, being used for controlling the continuous flow reaction system according to claim 7 and comprising an input unit and a control unit, wherein the input unit is used for selecting a preset reaction mode, and the control unit is used for outputting a control signal on the basis of the reaction mode selected through the input unit to control the continuous flow tube reaction system to operate, wherein the control unit comprises:

a plurality of feed control device, wherein each said feed control device is connected with one said feed tank to control a flow velocity and flow rate of one said reaction solution;

a mixing control device used for controlling a speed of the servo motor;

a preheating control device comprising a preheating temperature detection device and a preheating medium control device, wherein the preheating temperature detection device is used for detecting a temperature of the preheated solution in the preheated tube pass of the preheating device, and the preheating medium control device is used for controlling a temperature and flow velocity of the preheating medium in the preheated shell pass of the preheating device according to the temperature of the preheated solution; and     a reaction control device comprising a reaction condition detection device, a reactant flow velocity control device and a heating medium control device, wherein the reaction condition detection device comprises a temperature detection instrument, a pressure detection instrument and a flow velocity detection instrument and is used for detecting temperature, pressure and flow velocity data in the reaction tubes, the reactant flow velocity control device is used for controlling a flow velocity of the reactant according to the flow velocity data in the reaction tubes, and the heating medium control device is used for controlling a temperature and flow velocity of a heating medium in a shell pass of the reactor according to the temperature and pressure data in the reaction tubes.

\* \* \* \* \*